Figure 5:
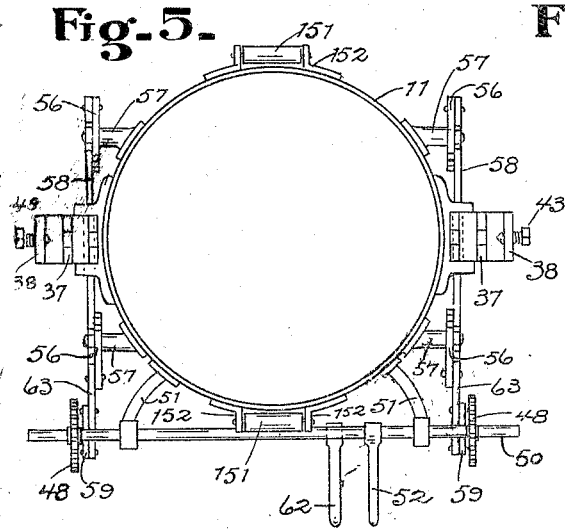

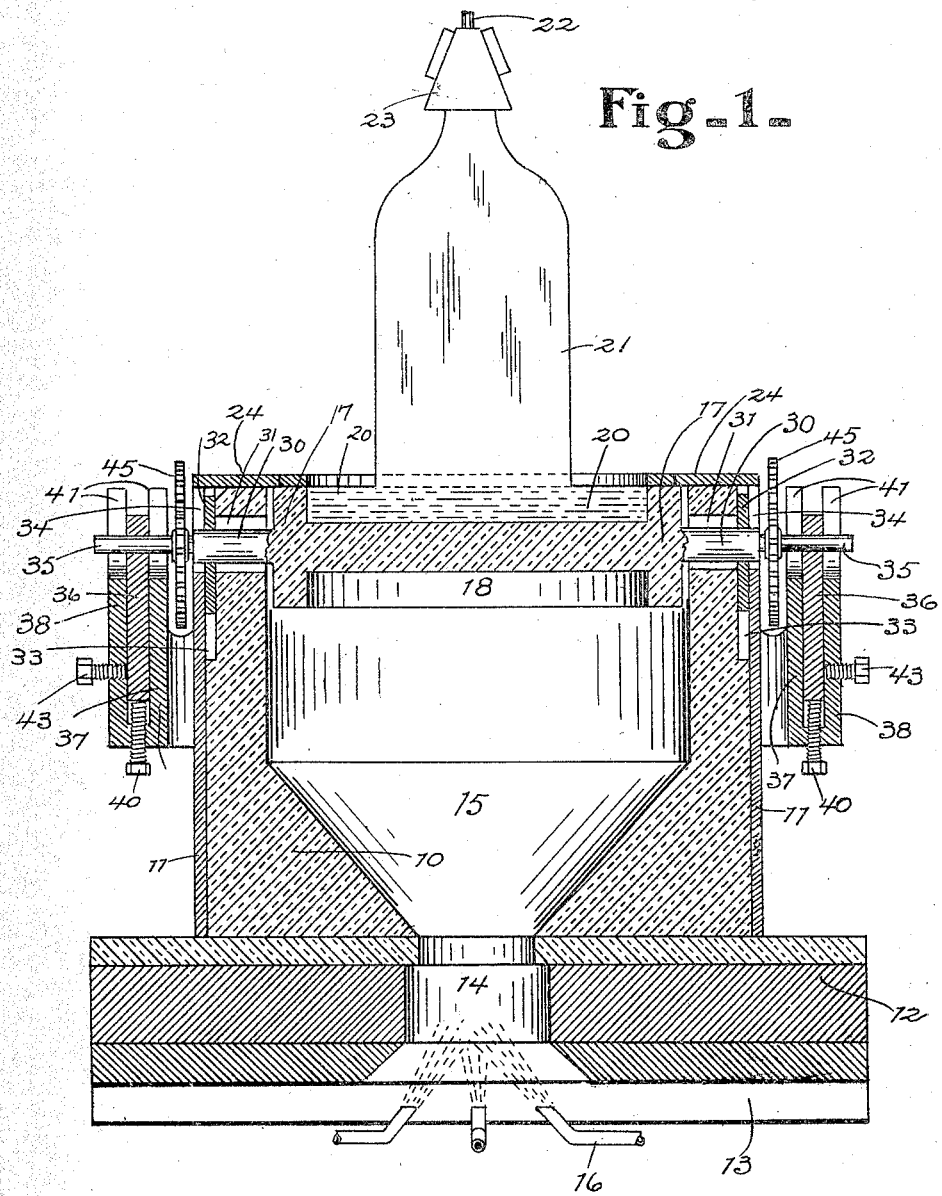

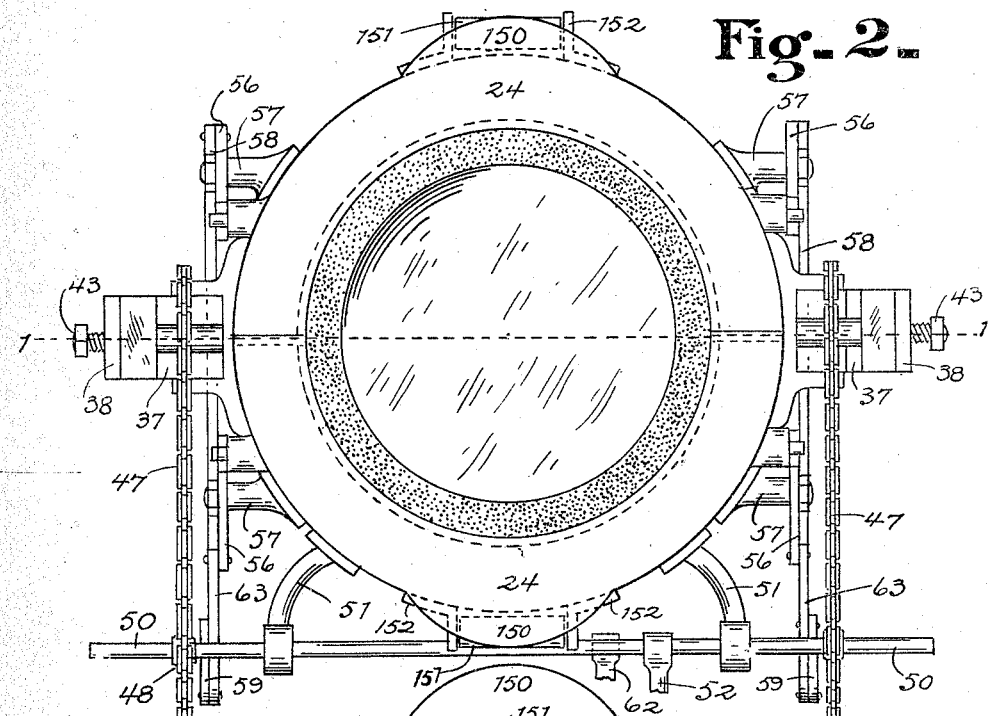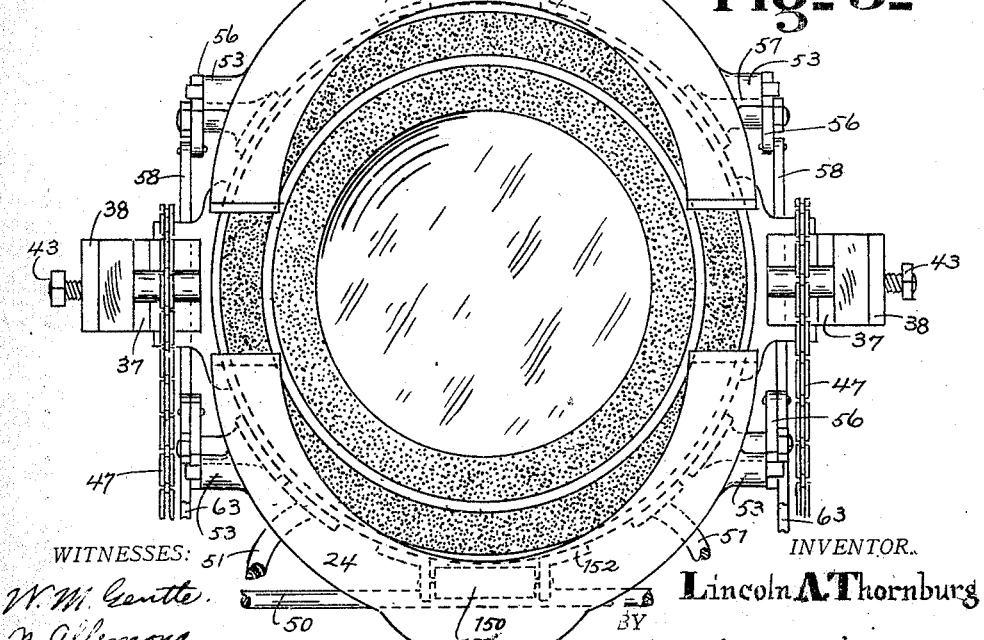

L. A. THORNBURG.
GLASS DRAWING MACHINE.
APPLICATION FILED SEPT. 26, 1907.

922,973.

Patented May 25, 1909
3 SHEETS—SHEET 3.

WITNESSES:
W. M. Gentle
N. Allemong.

INVENTOR.
Lincoln A. Thornburg
BY
W. H. Lockwood
ATTORNEY.

UNITED STATES PATENT OFFICE.

LINCOLN A. THORNBURG, OF HARTFORD CITY, INDIANA.

GLASS-DRAWING MACHINE.

No. 922,973.  Specification of Letters Patent.  Patented May 25, 1909.

Application filed September 26, 1907. Serial No. 394,684.

*To all whom it may concern:*

Be it known that I, LINCOLN A. THORNBURG, of Hartford City, county of Blackford, and State of Indiana, have invented a certain new and useful Glass-Drawing Machine; and I do hereby declare that the following is a full, clear, and exact description thereof, reference being had to the accompanying drawings, in which like numerals refer to like parts.

This invention relates to improvements on the device set forth in former Letters Patent granted to me, No. 759,329, dated May 10, 1904, for a glass-drawing apparatus. Said device relates to the mounting and manipulation of a double drawing-pot from which glass may be vertically drawn. In said device the drawing pot has a double cavity, one on each side thereof, and hence it is desirable to revolve the drawing-pot when one cavity has been emptied in order that a clean cavity may be turned upward for the reception of a new supply of glass to be drawn, and the formerly used cavity will be turned downward into the furnace so that the remnant of glass adhering to the bottom and walls thereof will be melted and permitted to drop down and away from it. In my former patent above referred to, said device is shown with a vertically movable drawing-pot which must be moved downwardly from the top stone in order that the pot may be revolved and then moved upward against the top stone.

The chief feature of my present invention consists in mounting the drawing-pot so that it will only revolve and not be moved upward or downward, and providing a top stone in sections that are removable somewhat to permit the revolution of the drawing-pot. Along with the foregoing idea means are provided for manipulating said sections of the top stone, that is, moving them out of and into place.

Another feature consists in the means for mounting the drawing-pot and revolving the same.

The foregoing features and the other improvements constituting this invention will be more fully understood from the accompanying drawings and the following description and claims.

Figure 4:
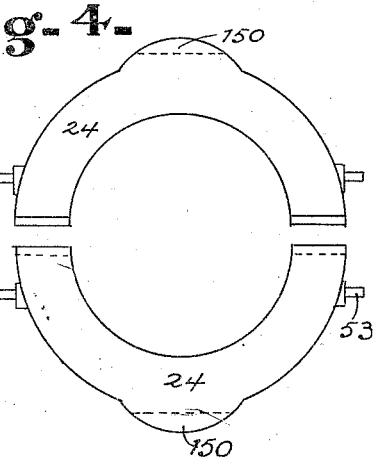
Figure 6:
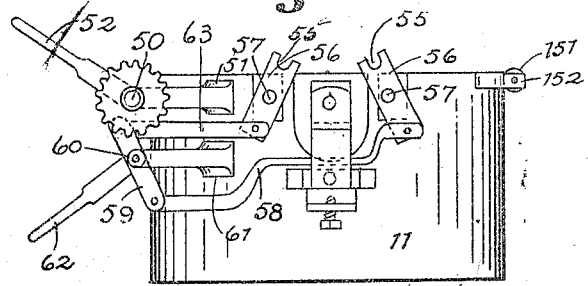
Figure 7:
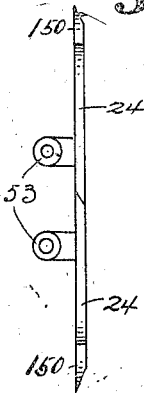
Figure 8:
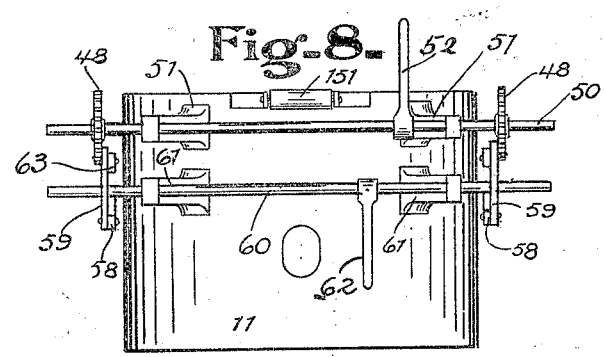

In the drawings Figure 1 is a central vertical section through the device showing a cylinder of glass being drawn, said section being on the line 1—1 of Fig. 2. Fig. 2 is a plan view of the entire device with sections of the top stone together, parts being broken away. Fig. 3 is the same with some parts omitted and the top stones moved away from each other to permit the revolution of the drawing mold. Fig. 4 is a plan view of the top stone separated. Fig. 5 is a plan view of a shell with the parts attached thereto on the outside thereof, the sprocket chains, however, being removed. Fig. 6 is an elevation of the right-hand side of what is shown in Fig. 5, with the parts in their position when the top stones are together. Fig. 7 is an elevation of the right-hand side of what appears in Fig. 4. Fig. 8 is a front elevation of what is shown in Fig. 5.

In the drawings the furnace body 10, which is built of some refractory material, such as fire-clay blocks and the like, is inclosed by a boiler iron shell 11 cylindrical in form, the two parts 10 and 11 resting upon a suitable base 12 formed of refractory material also, and said base rests upon I-beams 13, only one of which, however, is shown.

14 is an opening at the bottom of the furnace chamber 15 through which gas is introduced through pipes 16 extending from some suitable supply and with their outlet ends upturned substantially as shown in Fig. 1.

In the upper part of the furnace a glass pot 17 is mounted, which is symmetrical and double-sided having cavities 18 on the upper and lower sides thereof. Glass 20 from some supply of molten glass is ladled or otherwise deposited in the upper cavity 18 of the glass pot, and from it glass is drawn upward, as appears in Fig. 1, which shows a cylinder of glass 21 being drawn upward by a blow-pipe 22 which has an annular shell 23 on the lower end thereof. While the glass is being drawn from the upper side of the pot, it is kept warm and in condition for drawing by the heat in the furnace 15 below the pot. To keep the heated gases from escaping there is a sectional top stone 24 which rests upon the top of the furnace body 10 and also the drawing pot 11, the inner peripheral surface of said top stone registering and being flush with the inner peripheral surface of the wall of the drawing pot, as appears in Fig. 1.

After the glass has been drawn from the upper cavity of the drawing pot 17, said pot can be revolved so that the lower cavity will become uppermost and the upper one, which still contains some hardened glass, not drawn, will be lowermost. Then the upper receptacle is filled with glass to be drawn, and while it is being drawn, the hardened remnant of glass in the lower receptacle is melted by the heat in the furnace and runs down through the opening 15 into some receptacle below for such glass, so that by the time the glass is drawn from the upper cavity of the drawing pot 17, the lower cavity will be completely free from the remnant of glass and ready to be turned up again and filled for drawing.

In constructions of the kind heretofore it has been customary and necessary for the drawing pot to be lowered in the furnace in order that it could be turned without striking or interfering with the top stone 24. The chief feature of my present invention has for its object the avoidance of this mode of operation and consists in turning the drawing pot without moving it vertically down and up as heretofore, but instead I move the top stone out of the way of the turning drawing pot. Heretofore this top stone has been formed of one piece, but in my invention I divide it into two pieces, as shown in Figs. 2, 3, and 4, and I will now proceed to explain the mounting of the drawing pot and the means for revolving it, and then I will explain the means for moving the top stone 24 out of and into place.

As appears in Fig. 1 the drawing pot, which is cylindrical, is mounted on two trunnions 30 that extend through suitable round holes 31 in the sides of the clay furnace body 10 and also through plates 32 which are vertically slidable in slots 33 located between the upper parts of the shell 11 and furnace body 10. For this purpose vertical slots 34 are provided in the opposite sides of the shell 11. The chief function of the plates 32 is to close the opening 31 so that the heat and gases will not escape from the furnace. On the end of each trunnion 30 there is a reduced or smaller trunnion 35 having bearing in the adjustable bearing plate 36 located between a pair of brackets 37 and 38. These two brackets are shown connected at their lower ends, and the inner one is secured to the side of the shell 11. Adjusting screws 40 bear against the under side of the bearing plates 36 so as to elevate the drawing pot to the drawing point and to level the same. The two brackets 37 and 38 are provided with wide vertical slots 41 near their upper ends through which said small trunnions 35 extend so that said trunnions may have some lateral play or movement for adjustment to the exact drawing position, and when so adjusted, the drawing plates 36 are held from any lateral movement by set screws 43. This adjustment of the drawing pot is permitted by the large size of the openings 31 in the wall of the furnace chamber and the sliding plates 32 and the slots 34 and 41.

Upon each small trunnion 30 there is a sprocket wheel 45 secured, said sprocket wheels lying between the shell 11 and the inner brackets 37. By means of these sprocket wheels 45 the drawing pot is turned over, there being sprocket chains 47 extending from said wheels to sprocket wheels 48 secured on the shaft 50 mounted in the arms 51 that are secured to the side of the shell 11, and said shaft 50 is oscillated by a hand-lever 52 which is secured thereto.

The top stone sections 24 are semiannular so that the two when together form an annular stone for resting upon the annular wall of the drawing pot 17. Each top stone section has on its side an extension or lip 150 that rests upon a horizontal roller 151 mounted in bearing arms 152 that are secured to the shell 11 and extend outwardly therefrom, as appears in Fig. 5. The under side of each of the extensions or lips 150 is somewhat oval or beveled so that when the stones are separated to the position shown in Fig. 4, these extensions or lips 150 will rest and ride upon the rollers 151 so that said rollers will support the middle portion of said stone sections while they are being moved away from or toward each other, as shown in Figs. 2 and 3. When the stone sections are together, as shown in Fig. 2, the underside of the lips must be so formed that the rollers 51 will not lift the stones off of the drawing pot. These stone sections 24 are preferably made of cast-iron and have extending outward from near each end thereof pins 53 that fit in notches 55 in the shifting levers 56. These shifting levers are fulcrumed on pins 57 extending outward from the sides of the shell 11 and between the ends of said levers.

The levers are all simultaneously actuated by connecting bars 58, one on each side of the device, that are pivoted to the lower ends of one pair of levers 56 and to the lower ends of the rocking bars 59 on the ends of the shaft 60, which is mounted in the arms 61 secured to the shell 11, as seen in Figs. 6 and 8. Said shaft 60 is actuated by a hand lever 62 that is secured thereto. Connecting bars 63 are pivoted to the lower end of the other pair of levers 56 and to the upper end of the rocking bars 59, the arrangement of these parts being such that when the lever 62 is elevated, the upper ends of the levers 56 will move away from each other and, therefore, separate the top stones 24 and move them into the position shown in Fig. 3. On the other hand, when the hand lever 62 is depressed, said levers 56 will be moved into the position shown in Fig. 6, which will bring the two top stones together, as shown in Fig. 2.

What I claim as my invention and desire to secure by Letters Patent is:

1. In glass-drawing apparatus, a furnace open at the upper end, a revoluble pot mounted therein flush with the upper end of the furnace, a top stone formed of sections resting upon said furnace and pot, means for turning the pot over, and means for separating said sections to enable the pot to be turned over and to return said sections to their normal closed position.

2. In glass-drawing apparatus, a furnace open at the upper end with oppositely located horizontal holes therethrough, a pot provided with oppositely extending trunnions passing through said holes in the furnace, means on said trunnions for turning the pot over, a top stone formed of sections resting upon said pot and furnace, and means for separating the sections of said top stone to enable the pot to be turned over.

3. In glass-drawing apparatus, a furnace shell, a top stone formed of sections and resting upon said furnace shell, pins extending laterally from said top stone, and means mounted on each side of the shell for engaging said pins and moving the sections of the top stone outwardly away from and inwardly toward each other.

4. In glass-drawing apparatus, a furnace shell, a top stone formed of sections and resting upon said furnace shell, pins extending laterally from said top stone, levers pivoted on the sides of said shell in the upper ends of which the pins of said top stone sections fit, and means for oscillating the upper ends of said supporting levers away from and toward each other, substantially as set forth.

5. In glass-drawing apparatus, a furnace shell, a top stone formed of sections and resting upon said furnace shell, pins extending laterally from said top stone, levers pivoted on the sides of said shell in the upper ends of which the pins of said top stone sections fit, a connecting bar extending from the lower end of each lever, a rock-shaft, a handle for operating the same, and a rocking bar secured to each end of the rock-shaft and pivotally connected to said connecting bars for the simultaneous movement of said levers in opposite directions, substantially as set forth.

In witness whereof, I have hereunto affixed my signature in the presence of the witnesses herein named.

LINCOLN A. × THORNBURG.
his mark

Witnesses:
M. C. Lewis,
Thomas R. Moore.